H. M. PFLAGER.
CAR TRUCK.
APPLICATION FILED JULY 6, 1917.
1,276,688.
Patented Aug. 20, 1918.
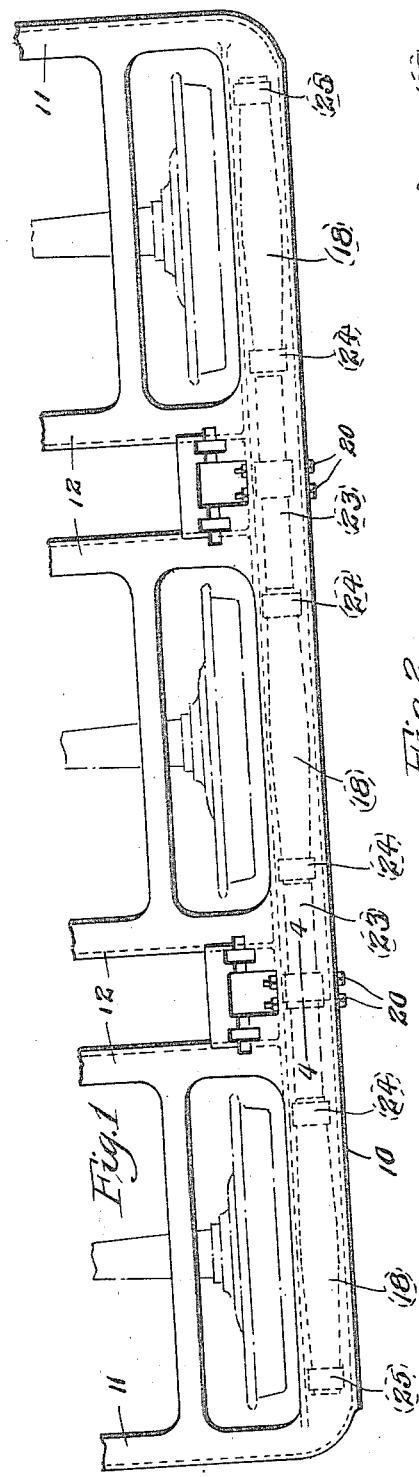
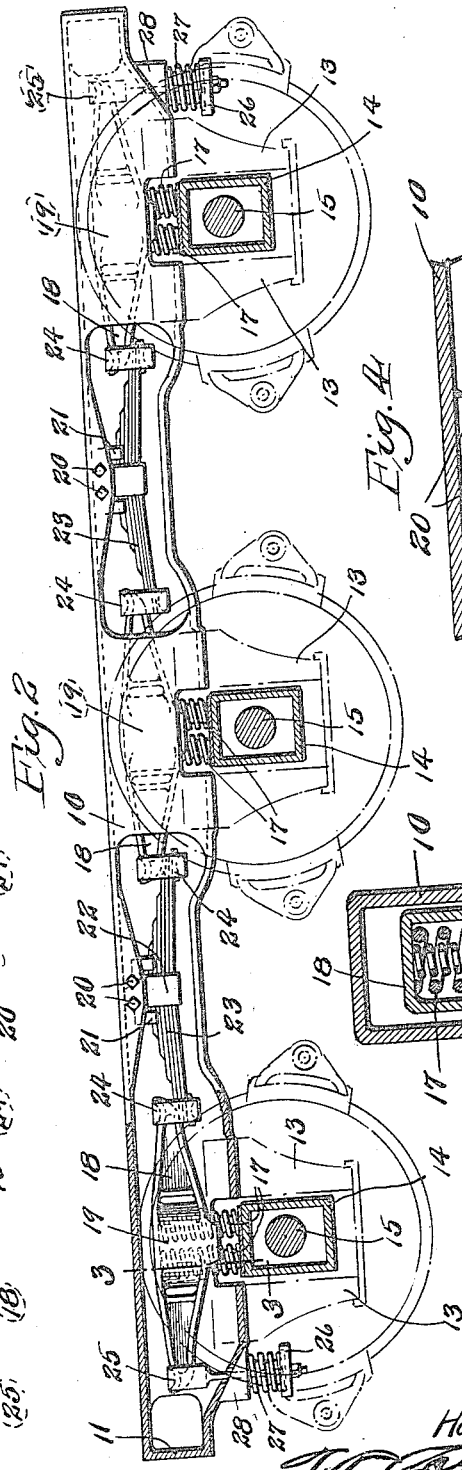
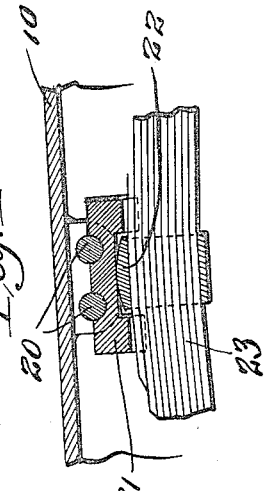
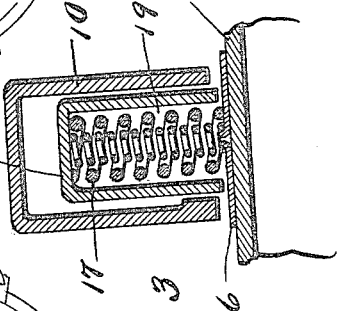
Inventor
Harry M. Pflager
By J. H. Cornwall, Atty

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,276,688.

Specification of Letters Patent. Patented Aug. 20, 1918.

Application filed July 6, 1917. Serial No. 179,040.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for yieldingly supporting the truck frame upon the journal boxes, which latter it will be understood contain the bearings for the wheel carrying axles, and this application should be read and considered in connection with Patents Numbers 1,080,555, 1,080,556, 1,080,557, 1,080,558 and 1,080,559, issued to the assignee of Clarence H. Howard and myself December 9, 1913.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibration due to track irregularities and preventing said shocks and vibration from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a plurality of springs, preferably of the semi-elliptic type, a plurality of substantially rigid equalizer members disposed in series with said springs, the latter bearing upon the car truck frame, and helical compression springs disposed between the journal boxes and the central portions of the equalizing members, all of said parts being preferably disposed within the substantially hollow wheel piece of the truck frame.

My invention further consists in certain novel features of construction and arrangement of parts, hereinafter more fully described and claimed, and illustrated in the accompanying drawings, in which—

Figure 1 is a plan view of the side portion of a truck frame, the same being equipped with the flexible support contemplated by my invention;

Fig. 2 is a side elevational view of the truck frame, parts thereof being broken away and in section and showing my improved supporting means associated therewith;

Fig. 3 is a cross section taken approximately on the line 3—3 of Fig. 2;

Fig. 4 is a detail section taken approximately on the line 4—4 of Fig. 1.

Referring by numerals to the accompanying drawings which illustrate a practical embodiment of my invention, 10 designates the wheel piece of an accepted type of six wheel truck frame, the same being preferably of integral construction and including end pieces 11 and transom members 12.

Rigidly fixed to and depending from the wheel piece of the truck frame are pedestal jaws 13 between which are positioned the usual journal boxes 14 which contain the bearings for the ends of the wheel carrying axles 15.

The wheel pieces 10 of the truck frame are preferably hollow and of box-like construction in cross section with the bottom wall or plate cut away at points between the pedestal jaws for the accommodation of the upper portions of the journal boxes and parts associated therewith. The outer wall of the wheel piece is cut away at suitable points, preferably between the pairs of pedestal jaws to permit the ready insertion or removal of the equalizer members and springs constituting my improved construction.

Located on top of the journal boxes are comparatively thin metal plates 16, the same serving as seats for two or more sets of vertically disposed helical compression springs 17. These sets of springs are preferably of the nested type, that is, there are two or more springs of different sizes arranged one within the other for each set.

Substantially rigid or non-elastic equalizing members 18 are arranged within the hollow wheel pieces above the journal boxes and formed in the undersides of said members are pockets 19 which receive the upper portions of the sets of springs 17. By virtue of this construction, each equalizing member is yieldingly supported upon one of the journal boxes and the springs associated with said equalizing member perform the functions of a yielding or resilient fulcrum therefor.

Bearing upon the upper portion of the wheel piece of the truck frame and preferably upon a pair of transversely disposed pins or bolts 20 at points between the journal boxes are blocks 21 and bearing against the undersides thereof are the curved top faces of bands or sleeves 22, which latter encircle the central portions of leaf springs 23, preferably of the semi-elliptic type. The ends of these leaf springs 23 pass through and bear upon the lower portions of vertically disposed loops or hangers 24, the upper portions of which bear upon the adjacent ends of the equalizing members 18.

Depending from the outer ends of the outer pair of equalizing members 18 or that pair which bears upon the outer pair of journal boxes 14 are hangers 25 which project through suitable slots or openings formed in the bottom plate of the wheel piece, and the lower ends of these hangers carry plates 26. These plates serve as supports for helical springs 27 of the compression type, the upper ends thereof bearing against brackets or lugs 28 which are arranged on the underside of the end portions of the wheel pieces.

In my improved construction it will be noted that the springs 23 are mounted for rocking movement upon the truck frame and that the substantially rigid equalizing members are supported by and fulcrumed upon the helical springs 17, which latter are supported by the journal boxes 14, and further that the outer ends of the outer pair of equalizing members are connected to the truck frame through the medium of the hangers 25 and helical springs 27. By virtue of this arrangement, a truck frame supporting structure is provided which is yielding and resilient to a comparatively high degree, and as a result, service shocks and vibration which may arise from the passage of the truck wheels over rough track, switches, crossings and the like are practically absorbed and eliminated and the riding movement of the supported car body is rendered more easy and gentle.

My improved spring and equalizer arrangement is effective in increasing the flexibility of the truck and equalizing the distribution of the carried weight upon all of the truck wheels. Furthermore, by arranging the springs and equalizing members within the hollow wheel pieces of the truck frame, they are practically inclosed and consequently protected from injury and further such arrangement leaves the brake beams, brake shoes, and brake rigging free for inspection and readily accessible in the event of repairs and adjustments.

While I have illustrated and described my invention as being particularly applicable for six wheel trucks, it will be understood that practically the same arrangement can be advantageously utilized in connection with trucks having other wheel arrangements.

It will be readily understood that minor changes in the size, form and construction of the various parts of my invention car truck can be made and substituted for those herein shown and described, without departing from the spirit of my invention, the scope of which is set forth in the appended claims.

I claim:

1. The combination with a car truck frame and its journal boxes, of a helical spring supported by each journal box, an equalizing member supported by each helical spring, springs disposed between said equalizing members and bearing upon the truck frame and the outer ends of the outer pair of equalizing members having yielding resilient connections with said truck frame.

2. A flexible support for railway car trucks comprising equalizing members having yielding and resilient supports upon the journal boxes associated with the truck frame, and springs disposed between and connected to said equalizing members, which springs bear upon the truck frame at points between the journal boxes.

3. A flexible support for railway car trucks comprising equalizing members having yielding and resilient supports upon the journal boxes associated with the truck frame, and springs disposed between and connected to said equalizing members, which springs bear upon the truck frame at points between the journal boxes, all of which parts are disposed within the substantially hollow wheel pieces of the truck frame.

4. A flexible support for railway car trucks comprising equalizing members having yielding and resilient supports upon the journal boxes associated with the truck frame, springs disposed between and connected to said equalizing members, which springs bear upon the truck frame at points between the journal boxes, and flexible and resilient connections for the outer one of the outer pair of equalizing members and the truck frame.

5. The combination with a car truck frame and its journal boxes, of springs mounted for rocking movement upon the truck frame at points between the journal boxes, equalizing members connected to said springs and yieldingly supported upon the journal boxes, and yielding connections between the outer ends of the outer pair of equalizing members and the truck frame.

6. In a flexible support for railway car trucks, a helical spring supported by each journal box associated with the truck, an equalizing member supported by each helical spring and the ends of said equalizing members having resilient connections with the truck frame.

7. In a flexible support for railway car trucks, a yielding pressure member supported by one of the truck journal boxes, an equalizing member supported by said resilient means, and yielding pressure connections between said equalizing member and the truck frame.

8. In a flexible support for railway car trucks, an equalizing member disposed above each journal box associated with the truck, there being a pocket formed in the underside of said equalizing member, a spring bearing upon the journal box and occupying the pocket in the equalizing member, and flexible connections between the equalizing member and the truck frame.

9. A flexible support for railway car trucks comprising alternately arranged equalizing members and springs, the same being disposed in series with the springs bearing upon the truck frame, helical springs between the equalizing members and the journal boxes associated with the truck and resilient connections between the outer ends of the outer pair of equalizing members and the truck frame.

10. A flexbile support for railway car trucks comprising alternately arranged leaf springs and equalizing members, the same being disposed in series with the springs bearing upon the truck frame the equalizing members having yielding fulcrums supported by the truck journal boxes and resilient connections between the outer ends of the outer pair of equalizing members and the truck frame.

In testimony whereof I hereunto affix my signature, this 26th day of June, 1917.

HARRY M. PFLAGER.